May 19, 1959   B. R. HARRELL ET AL   2,887,364
REMOVAL OF IMPURITIES FROM CAUSTIC SODA SOLUTIONS
Filed Feb. 14, 1957
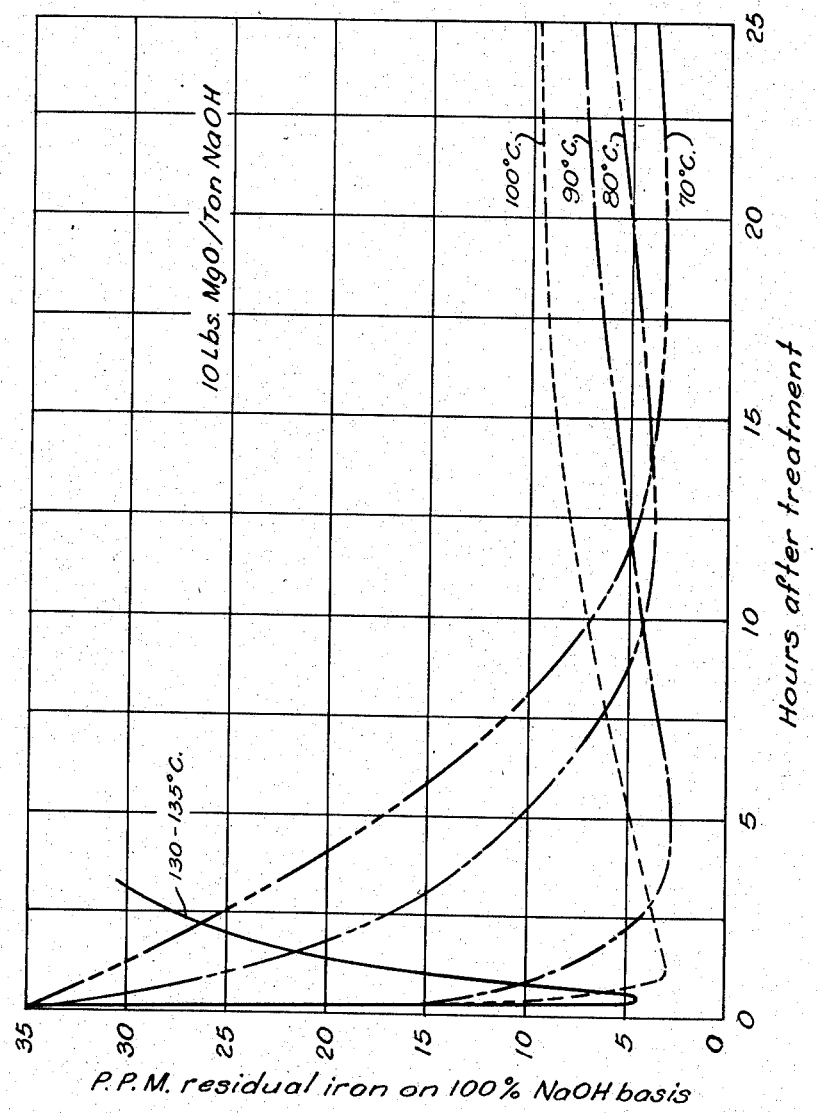
INVENTORS.
Bob R. Harrell
George A. Forester
BY
Griswold & Burdick
ATTORNEYS United States Patent Office 2,887,364
Patented May 19, 1959

2,887,364

REMOVAL OF IMPURITIES FROM CAUSTIC SODA SOLUTIONS

Bob R. Harrell, Lake Jackson, and George A. Forester, Freeport, Tex., assignors to The Dow Chemical Company, Midland, Mich., a corporation of Delaware Application February 14, 1957, Serial No. 640,289

18 Claims. (Cl. 23—184)

This invention relates to a process for purifying caustic soda solutions, and more particularly, to an improved method of removing iron from aqueous solutions of caustic soda where it is present therein as an impurity.

It is known that commercial aqueous solutions of caustic soda, unless specially treated, are contaminated with from 10 to over 100 parts of iron per million parts of sodium hydroxide on a dry basis. For many of the modern uses of caustic soda, the presence of any metal is detrimental and iron is particularly undesirable. Numerous methods have been disclosed for the removal of iron impurities where a compound is added to the caustic to effect such removed. U.S. Patent 2,634,192 discloses a process for removing the iron impurities by using a substantially anhydrous dead burned magnesium oxide. The caustic soda solution is treated with addition of magnesium oxide at a temperature above 105 degrees C., agitated and filtered. When the caustic soda is treated in this manner, the iron impurities in the solution are very rapidly reduced to around 5 parts per million parts of anhydrous caustic soda, but upon standing the iron concentration will begin to increase. In commercial operation, considerable length of time is required to filter the treated caustic solution and as a result the iron concentration increases to above the allowable limit. Many of the known methods of treatment will remove the iron impurity but the compound added will itself contaminate the caustic and is very difficult to remove by ordinary methods. When compounds of strontium are used, such as the sulfate, the rate at which the treated caustic soda solution may be filtered is quite rapid but the residual strontium in the finished product is also quite high. Treatment of the solution with magnesium oxide such as described above leaves far less metal residue in the finished product than the strontium treatment but greatly decreases the filtering rate.

Generally speaking the effectiveness of a compound to remove iron from caustic soda solutions cannot be predicted. Many compounds of similar structure to known iron removal agents are known to be generally ineffective. Such compounds as magnesium carbonate, magnesium chloride hexahydrate, alumina and magnesium hydroxide are in this category.

It is, therefore, a principal object of this invention to provide an improved method for removing dissolved iron impurities from concentrated caustic soda solutions where the iron impurities once reduced will not later appreciably increase upon standing or during the time required for filtration of the mixture. A further object is to provide an improved process where the iron impurities in the caustic are reduced to a lower level with less magnesium oxide than previously attained. Still a further object is to provide an improved process where the rate of filtration of the treated caustic soda solution is increased and the concentration of metals in the finished product is maintained at a lower level than previously attained. Other objects and advantages will become apparent when the detailed specification is read in conjunction with the attached drawing which shows the effect of treating temperature on the residual iron remaining in the treated caustic as a function of time.

The above and other objects may be accomplished by the addition of active magnesium oxide or active magnesium hydroxide, as hereinafter defined, to a caustic soda solution containing from 40 to 70 weight percent of caustic in proportions of from 1½ to 10 pounds of active magnesium oxide, or from 7 to 30 pounds of active magnesium hydroxide, per ton of anhydrous caustic soda present in the solution at a temperature in the range of 40 to 85 degrees C., and separating a caustic soda having a major portion of the impurities removed therefrom.

The term "dead burned magnesium oxide," as used herein means magnesium oxide which is obtained by calcining magnesium hydroxide precipitated from aqueous solutions at a temperature in the range of 825 to 1150 degrees C. and comminuting the calcined product to pass through a number 200 to a number 400 standard sieve. The source of the magnesium is unimportant as the magnesium may come from sea water, natural brines, artificial brines or natural magnesium ores. The critical factor in the preparation of the dead burned magnesium oxide is that the magnesium hydroxide which is calcined be prepared from aqueous solutions.

It has been discovered that when "dead burned magnesium oxide" is added to the caustic soda solution at a temperature of 40 to 85 degrees C., the iron impurity in the caustic soda solution will be reduced and will not increase to an undesirable level during the time required for filtering or upon long standing. The effect of temperature upon the iron removal is shown in the attached drawing wherein the abscissa represents the length of time in hours that the magnesium oxide is contacted with the caustic, and the ordinate, the iron content of the caustic in parts of iron per million parts of anhydrous caustic. The curves indicate the iron content of the caustic when it is treated at different temperatures. The details and the data upon which the curve is based are given in Example I below.

It will be seen from the curves that at a temperature of 40 to 85 degrees C., the iron content in the caustic is reduced at a rate slower than that obtained at higher temperatures but once the reduction is effected it will not appreciably increase upon standing. The effect of temperature can be fully realized when the curves for the lower temperatures are compared to the results of treatment at 130 to 135 degrees C. where the iron content in the caustic almost reaches its original content in about three hours after being once reduced to about 5 parts per million.

Although the treatment of the caustic soda solution with any dry "dead burned magnesium oxide" at the temperature cited above will prevent the iron content in the solution from increasing to undesirable amounts, it has been further discovered that when an active magnesium oxide is used and when the magnesium oxide is first made into a water or caustic slurry before its addition to the caustic solution, a more rapid and surprisingly much more complete removal of iron impurities can be effected with less magnesium oxide than previously obtainable. Since there is no method for calcining or for the preparation of a magnesium oxide consistently having the required activity, an activity test is used to determine whether the magnesium oxide once produced has the required activity. The test consists of adding 5 grams of the magnesium oxide to 100 milliliters of 1 normal hydrochloric acid containing 6 drops of methyl red indicator. The mixture is stirred constantly until a color change from red to yellow is observed. The lapse of time after the addition of the magnesium oxide until the appearance of the yellow color, herein referred to as "reaction time," is the critical property of the magnesium oxide in determining its effectiveness. "Active" magnesium oxide as used herein is intended to mean that magnesium oxide which has a reaction time in the above test of from 40 to 90 seconds. A product having a longer reaction time than 90 seconds indicates an improper particle size, while a shorter time shows improper calcination. A product which is prepared by calcining at 825 to 1150 degrees C., ground to pass through a number 325 sieve, and has a bulk density of from 40 to 80 lbs. per cubic foot will generally have the required activity. However, it is necessary to test each batch to determine whether this particular product is acceptable. In preparing different batches under apparently the same conditions, the product from one of the runs may meet the activity test as set forth while another may not.

The method of addition of the magnesium oxide to the caustic solution to be treated also affects the iron removal. The magnesium oxide may be added to the caustic solution in a powder form, but when the magnesium oxide is first made into a water or caustic soda slurry and then added to the caustic solution, the iron impurity can be removed to a level containing less than 2 parts of iron per million parts of anhydrous caustic. The removal is effected in considerably less time and less magnesium oxide may be used. Also by using a slurry, the method of addition of the magnesium oxide is simplified, since it can be easily pumped into the mixture and less agitation is required to intermix the magnesium oxide with the caustic. While water or caustic solution may be used to make a slurry, it is preferred to use a caustic solution. The concentration of the magnesium oxide in the slurry is not critical and concentrations in the range of 10 to 50 weight percent of magnesium oxide may be used, preferably 15 to 25 weight percent. Slurries containing more than 50 weight percent of magnesium oxide are difficult to pump.

When the magnesium oxide is added to the caustic soda solution, the mixture must be agitated to obtain a good contact between the magnesium oxide and the caustic. The agitation is not critical but should be sufficient to completely intermix the magnesium oxide with the caustic. Time required to effect the iron removal will vary with temperature, as can be seen from the attached figure.

Since the iron is removed from relatively concentrated solutions of caustic containing from 40 to 70 weight percent of sodium hydroxide, the addition of magnesium oxide may be conveniently made to the caustic solution right after the solution has been concentrated by evaporation. After the evaporation, the solution is cooled before it can be filtered which may require from 20 to 25 hours. It is during this cooling time that the caustic is generally treated to remove the metal impurities. When the caustic has been cooled to a temperature in the range of 40 to 85 degrees C. the active magnesium oxide is added, intermixed with the caustic by agitation and allowed to cool further. Generally, by the time the caustic has cooled to a temperature in the range of 15 to 45 degrees C., sufficient time has elapsed to obtain the iron removal.

The amount of active magnesium oxide that is required to be added to the caustic will vary according to the iron content of the caustic solution treated. More active magnesium oxide is required for the solutions containing a higher concentration of iron. For caustic solutions containing up to around 100 parts of iron per million parts of anhydrous caustic, 1½ to 10 pounds of active magnesium oxide per ton of anhydrous sodium hydroxide may be used, preferably from 2 to 5 pounds of active magnesium oxide per ton of anhydrous caustic when the active magnesium oxide is added as a slurry, and from 7 to 10 pounds per ton when the active magnesium oxide is added in a powder form.

It has further been discovered that "active" magnesium hydroxide may be successfully used to remove metal impurities from solutions of caustic soda. The use of magnesium hydroxide to purify caustic soda solutions has not heretofore been successful as "inactive" or commercial magnesium hydroxide was used. This material causes filters to become plugged, requires long filtration times and great filter cleaning difficulties. The product caustic soda after such treatment is contaminated with a high magnesium concentration and the amount of iron removed is negligible. It is now known that "active" magnesium hydroxide alone has the unique ability to reduce the iron concentration of the finished caustic soda to below 8 parts per million and at the same time to maintain the magnesium content in the finished product to an acceptable level. The use of "active" magnesium hydroxide has the additional advantage of allowing rapid filtration of the treated caustic soda solution.

When "active" magnesium hydroxide is introduced into solutions of caustic soda, it will remove the metal impurities and form agglomerates which are much larger than the original magnesium hydroxide crystals. Due to the unusual structure of this material, separation of the magnesium hydroxide together with the metal impurities may be effected rapidly on any standard type of filter with the use of appreciably less filter aid. The "active" magnesium hydroxide may be introduced into the caustic soda solution as a slurry in water or caustic solutions without any effect on its action. A slurry containing from 30 to 70 weight percent active magnesium hydroxide is preferred, however, as a matter of convenience in handling.

For magnesium hydroxide to be considered as "active," special treatment is required and this treatment is critical to its ability to effectively remove iron from concentrated caustic solutions. "Active" magnesium hydroxide is best characterized by its method of preparation. In this preparation, it is necessary to keep a large quantity of crystals of magnesium hydroxide relative to the amount being precipitated in unit time in constant agitation in the immediate vicinity of all points of precipitation. This method of preparation is applicable only to processes where the magnesium hydroxide is precipitated from dilute solutions of magnesium salts with an alkali such as sodium hydroxide. U.S. Patent 2,479,138 describes a flocculent zone and a vigorous agitation zone. By using these two zones and in addition by insuring that the residence or agitation time is at least 45 minutes in the vigorous agitation zone and that the pH is maintained between 10 and 11, an active magnesium hydroxide is provided. It is preferred that an agitation time of from 0.75 to 4.0 hours be used. This will yield coarse crystals as opposed to fine crystals or the flocculent material of the low turbulence zone. If an agitation time of less than 0.75 hour is used, the material produced will not be "active" magnesium hydroxide. A greater agitation time than 4.0 hours may be used but this is a practical limit. The preferred method of agitation in the high turbulence zone is rapid recycle of the crystal slurry by removal from the bottom of the zone and reintroduction into the top of the zone. When this method is employed, the ratio of the crystal slurry recycled to that remaining in the zone must be from 20:1 to 50:1 with from 30:1 to 40:1 being preferred. The pH range is critical and a variation above 11 or below 10 will prevent the formation of "active" magnesium hydroxide.

"Active" as used herein is intended to mean with regard to magnesium hydroxide that the magnesium hydroxide was that prepared by the foregoing method.

In order for "active" magnesium hydroxide to effectively remove iron impurities from caustic soda solutions, it is necessary to add the magnesium hydroxide to caustic soda solution which is at a temperature of between 40 and 85 degrees C. and to agitate the mixture for a period of 5 to 24 hours with from 6 to 12 hours being preferred. Longer periods of agitation will not adversely affect the iron removal but shorter agitation periods will cause the iron residue in the finished caustic soda solution to increase.

Whether it is preferred to use active magnesium oxide or active magnesium hydroxide to remove iron impurities from a given solution of caustic soda will depend upon the individual situation. If iron concentration of less than 5 parts per million parts of caustic soda is desired with a minimum use of the removal agent, active magnesium oxide should be used in slurry form. If all metals, including magnesium must be as low as possible or if high filtration rates are required, active magnesium hydroxide should be used. The use of either will improve upon any of the prior methods of removal of metallic impurities from solutions of caustic soda.

The separation of the magnesium oxide or magnesium hydroxide from the treated caustic soda solution may be effected by various methods, such as settling, centrifugation, filtering and the like. It is preferred to obtain the separation by filteration using a leaf-type filter with filter aid, since this type of filter may be more easily adaptable to this process.

EXAMPLE I

An active magnesium oxide having an activity test reaction time of 55 to 60 seconds was made into a slurry in 50% caustic soda solution. The slurry contained 20 percent by weight of active magnesium oxide. To a nickel flask containing 1600 grams of a 50 weight percent caustic solution containing 36 parts of iron per million parts of anhydrous sodium hydroxide was added 4 grams of the magnesium oxide in the form of a 20 weight percent slurry at various temperatures. The mixture was agitated and samples of caustic soda solution were periodically withdrawn, cooled, filtered and the caustic soda product was analyzed for residual iron. The results obtained are given in the table below and plotted in the attached figure.

A. Treatment temperature=70° C.

| Time in hours: | P.p.m residual iron on 100% NaOH basis |
|---|---|
| 0.5 | 33.5 |
| 1.0 | 31.0 |
| 3.0 | 23.5 |
| 5.0 | 17.5 |
| 10.0 | 7.0 |
| 15.0 | 3.5 |
| 20.0 | 3.5 |
| 24.0 | 3.5 |

B. Treatment temperature=80° C.

| Time in hours: | |
|---|---|
| 0.5 | 30.0 |
| 1.0 | 25.0 |
| 3.0 | 15.5 |
| 5.0 | 10.0 |
| 10.0 | 4.0 |
| 15.0 | 4.0 |
| 20.0 | 5.0 |
| 24.0 | 6.0 |

C. Treatment temperature=90° C.

| Time in hours: | |
|---|---|
| 0.5 | 12.5 |
| 1.0 | 9.0 |
| 3.0 | 4.0 |
| 5.0 | 3.0 |
| 10.0 | 4.0 |
| 15.0 | 6.0 |
| 20.0 | 7.0 |
| 24.0 | 7.5 |

D. Treatment temperature=100° C.

| Time in hours: | P.p.m residual iron on 100% NaOH basis |
|---|---|
| 0.5 | 11.0 |
| 1.0 | 3.0 |
| 3.0 | 4.0 |
| 5.0 | 5.0 |
| 10.0 | 7.0 |
| 15.0 | 8.5 |
| 20.0 | 9.5 |
| 24.0 | 9.5 |

E. Treatment temperature=130–135° C.

| Time in hours: | |
|---|---|
| 0.5 | 4.5 |
| 1.0 | 12.5 |
| 3.0 | 29.5 |
| 5.0 | -- |
| 10.0 | -- |
| 15.0 | -- |
| 20.0 | -- |
| 24.0 | -- |

The above data readily demonstrates that the higher temperatures effect the iron removal more rapidly, but within the normal residence or treatment time, the residual iron concentration has increased to an objectionable level. Lower temperatures require a longer initial period to remove the iron but then retain the low concentration beyond the normal residence time.

EXAMPLE II

Four grams of active magnesium oxide having a reaction time of 55 to 60 seconds was added to each of two nickel flasks containing 1600 grams of 50% by weight NaOH at 80° C. This mixture was then stirred for seven hours. The magnesium oxide was added to the first flask as a slurry of 20% by weight magnesium hydroxide in 50% caustic soda solution, while the magnesium oxide was added to the second flask as a dry powder. Samples were withdrawn every hour, filtered and analyzed for parts per million iron residue. The following chart will summarize the results:

| Time in Hours | MgO Fed as Slurry, p.p.m. Residual Iron | MgO Fed Dry, p.p.m. Residual Iron |
|---|---|---|
| 0 | 36.0 | 36.0 |
| 1 | 8.5 | 23.1 |
| 2 | 5.2 | 14.8 |
| 3 | 1.5 | 12.2 |
| 4 | 1.2 | 7.7 |
| 5 | 1.4 | 6.5 |
| 6 | 1.1 | 5.3 |
| 7 | 1.1 | 4.6 |

EXAMPLE III

Two grams of dead burned magnesium oxide having a reaction time of 50 to 55 seconds was added to a nickel flask containing 1600 grams of 50% by weight caustic soda solution. This is equivalent to only 5 lbs. of magnesium oxide per ton of anhydrous caustic soda. The treatment temperature was 75° C. and the magnesium oxide was added as a slurry of 20% by weight magnesium oxide in a 50% caustic soda solution. A sample was withdrawn every hour for 6 hours, filtered and analyzed for parts per million residual iron. The following chart will summarize the results:

| Time in hours: | P.p.m. residual iron |
|---|---|
| 0 | 36.0 |
| 1 | 21.0 |
| 2 | 8.8 |
| 3 | 4.9 |
| 4 | 3.7 |
| 5 | 3.1 |
| 6 | 3.0 |

EXAMPLE IV

To a series of nickel flasks containing 1600 grams of 50% by weight caustic soda solution at 125° C. was added 4.0 gm. samples of magnesium oxide having various reaction times. The mixtures were stirred for 35 minutes and a sample was removed and analyzed for residual iron. The following chart will summarize the results:

HCl activity test

| Reaction time in seconds: | P.p.m. residual iron |
|---|---|
| 41 | 1.2 |
| 43 | 1.2 |
| 56 | 2.6 |
| 65 | 2.7 |
| 75 | 3.1 |
| 80 | 2.9 |
| 86 | 3.3 |
| 88 | 3.7 |
| 91 | 5.3 |
| 104 | 8.4 |
| 123 | 18.5 |
| 298 | 24.2 |
| 635 | 28.6 |

EXAMPLE V

The nickel flasks containing 1600 gm. of 50% by weight caustic soda solution contaminated with 73 parts of iron per million parts of anhydrous caustic soda were placed in a 60° C. constant temperature bath and allowed to remain therein until the caustic soda reached bath temperature. To flask No. 1 was added 4.8 gm. of active magnesium hydroxide in a slurry containing 60% water and which corresponds to 8 pounds of magnesium hydroxide per ton of anhydrous caustic soda in solution. To flask No. 2 was added 4.8 gm. of inactive commercial magnesium hydroxide in a slurry containing 60 percent water and which corresponds to 8 pounds of magnesium hydroxide per ton of anhydrous caustic soda. To flask No. 3 was added 2.0 gm. of active magnesium oxide in a slurry containing 80 percent water and which corresponds to 5 pounds of magnesium oxide per ton of anhydrous caustic soda solution. The flasks were then stirred for six hours, filtered through a fritted glass filter and the filtrate analyzed for residual iron and magnesium. The following chart will summarize the results:

| Flask No. | Treating Agent | Filtration in hours | P.p.m. Residual Iron | P.p.m. Residual Magnesium |
|---|---|---|---|---|
| 1 | Active Mg (OH)$_2$ | 1 | 10 | 50 |
| 2 | Inactive Mg (OH)$_2$ | 2 | 73 | 1,500 |
| 3 | Active MgO | 4 | 10 | 300 |

EXAMPLE VI

In order to evaluate the effectiveness of active magnesium hydroxide and active magnesium oxide under actual conditions of plant operation, two separate runs were made in a commercial caustic soda plant. In one run, 8 pounds of active magnesium hydroxide per ton of anhydrous caustic soda was added to the cooling tanks of the plant. In the other run, 4 pounds of active magnesium oxide per ton of anhydrous caustic soda was added to the tanks. The product caustic soda from the first filtration was analyzed in both cases for residual metals. The table below shows the results obtained. A subsequent filtration will reduce the iron content to less than 5 p.p.m. and will reduce the other components proportionally.

| Metals | Concentration of Metals in p.p.m. after Treating but Before Filtration | Concentration of Metals in p.p.m. after Treatment with Active Magnesium Hydroxide and after Filtration | Concentration of Metals in p.p.m. after Treatment with Active Magnesium Oxide and after Filtration |
|---|---|---|---|
| Magnesium | 1,900 | 50 | 300 |
| Iron | 73 | 14 | 12 |
| Strontium | <10 | <10 | <10 |
| Calcium | 200 | 34 | 39 |
| Nickel | 6.1 | <1 | <1 |
| Copper | 0.8 | 0.7 | 0.8 |
| Aluminum | 19 | 4.2 | 7.7 |
| Silicon | 260 | 62 | 136 |
| Manganese | 2 | 1.0 | 1.0 |

What is claimed is:

1. A process for removing a substantial proportion of the initial iron impurities from solutions of caustic soda which comprises the addition of a compound selected from the group consisting of active magnesium hydroxide and active magnesium oxide to the caustic soda solution at a temperature in the range of 40 to 85° C., agitating the mixture for at least 5 hours, and separating a caustic soda having a major proportion of the iron impurities removed therefrom.

2. A process for removing a substantial proportion of the initial iron impurities from solutions of caustic soda which comprises the addition of active magnesium hydroxide to the caustic soda solution at a temperature in the range of 40 to 85° C., agitating the mixture for at least 5 hours, and separating a caustic soda having a major proportion of the iron impurities removed therefrom.

3. A process for removing a substantial proportion of the initial iron impurities from solutions of caustic soda which comprises the addition of active magnesium hydroxide to the caustic soda solution at a temperature in the range of 40 to 85° C., agitating the mixture for at least 5 hours, and filtering to obtain a caustic soda having a major proportion of the iron impurities removed therefrom.

4. A process for removing substantially all initial iron impurities from solutions of caustic soda, which comprises the addition of active magnesium hydroxide, which has been prepared by precipitation under conditions of low turbulence to form a flocculent material and feeding this material to a zone of vigorous agitation where the residence time in the agitation zone is at least 45 minutes and the pH is maintained between 10 and 11, to the caustic soda solution at a temperature in the range of 40 to 85° C., agitating the mixture for at least 5 hours, and separating a caustic soda solution having a major portion of the iron impurities removed therefrom.

5. A process for removing substantially all initial iron impurities from solutions of caustic soda which comprises the addition of active magnesium hydroxide to the caustic soda solution at a temperature in the range of 55 to 80° C., mixing for from 8 to 12 hours and separating a caustic soda solution having substantially all iron impurities removed therefrom.

6. A process for removing a substantial proportion of the initial iron impurities from solutions of caustic soda containing from 40 to 70 weight percent of sodium hydroxide, which comprises the addition to the caustic soda solution of 7 to 30 pounds of active magnesium hydroxide per ton of anhydrous caustic soda present in the caustic soda solution, at a temperature in the range from 55 to 80° C., agitating the mixture from 8 to 12 hours and separating a caustic soda solution having a major portion of the iron impurities removed therefrom.

7. A process for removing a substantial proportion of the initial iron impurities from solutions of caustic soda containing from 40 to 70 weight percent of sodium hydroxide, which comprises the addition to the caustic soda solution of 7 to 30 pounds of active magnesium hydroxide per ton of anhydrous caustic soda present in caustic soda solution, at a temperature in the range from 55 to 80° C., agitating the mixture from 8 to 12 hours and filtering to obtain a caustic soda solution having a major portion of the iron impurities removed therefrom.

8. A process for removing a substantial proportion of the initial iron impurity from solutions of caustic soda containing from 10 to 100 parts of iron per million parts of caustic soda wherein the caustic soda solution contains from 40 to 70 percent by weight of sodium hydroxide, which comprises the addition to the caustic soda solution of 8 pounds of active magnesium hydroxide per ton of anhydrous caustic soda present in the caustic soda solution, at a temperature of 60° C., agitating the mixture for 9 hours and filtering to obtain a caustic soda solution having a major proportion of the iron impurities removed therefrom.

9. A process for removing a substantial proportion of the initial iron impurities from solutions of caustic soda, which comprises the addition of active magnesium oxide to the caustic soda solution at a temperature in the range from 40 to 85° C., agitating the mixture for at least 5 hours, and separating a caustic soda having a major proportion of the iron impurities removed therefrom.

10. A process for removing a substantial proportion of the initial iron impurities from solutions of caustic soda, which comprises the addition of active magnesium oxide to the caustic soda solution at a temperature in the range of 40 to 85° C., agitating the mixture for at least 5 hours, and filtering to obtain a caustic soda having a major proportion of the iron impurities removed therefrom.

11. A process for removing substantially all initial iron impurities from solutions of caustic soda, which comprises the addition of active magnesium oxide which has been prepared by calcining magnesium hydroxide at a temperature in the range of 825 to 1125° C., and comminuting to a size sufficient to pass through a number 200 to a number 400 standard sieve and which has a reaction time of from 40 to 90 seconds with a caustic solution to form a slurry containing from 10 to 50 weight percent magnesium oxide, adding the slurry to the concentrated caustic solution in an amount such that the caustic soda solution will contain from 1½ to 10 pounds of magnesium oxide per ton of anhydrous caustic soda present in the solution at a temperature in the range of from 40 to 85° C., agitating the mixture for at least 5 hours, and separating a caustic soda solution having a major proportion of the iron impurities removed therefrom.

12. A process for removing substantially all initial iron impurities from solutions of caustic soda, which comprises the addition of active magnesium oxide to the caustic soda solution at a temperature in the range of from 55 to 80° C., mixing for from 8 to 12 hours and separating a caustic soda solution having substantially all iron impurities removed therefrom.

13. A process for removing a substantial proportion of the initial iron impurities from solutions of caustic soda containing from 40 to 70 percent by weight of sodium hydroxide, which comprises the addition to the caustic soda solution of 1½ to 10 pounds of active magnesium oxide in the form of a slurry containing from 10 to 50 weight percent magnesium oxide at a temperature in the range of from 40 to 85° C., agitating the mixture from 8 to 12 hours and separating a caustic soda solution having a major portion of the iron impurities removed therefrom.

14. A process for removing a substantial proportion of the initial iron impurities from solutions of caustic soda containing from 40 to 70 weight percent sodium hydroxide, which comprises the addition to the caustic soda solution of 1½ to 10 pounds of active magnesium oxide in the form of a slurry containing from 10 to 50 weight percent magnesium oxide at a temperature in the range of from 40 to 85° C., agitating the mixture from 8 to 12 hours and filtering to obtain a caustic soda solution having a major proportion of the iron impurities removed therefrom.

15. A process for removing a substantial proportion of the initial iron impurity from solutions of caustic soda containing from 10 to 100 parts of iron per million parts of caustic soda wherein the caustic soda contains from 40 to 70 percent by weight sodium hydroxide, which comprises the addition to the caustic soda solution of 8 pounds of active magnesium oxide per ton of anhydrous caustic soda present in the solution, at a temperature of 60° C., agitating the mixture for 9 hours and filtering to obtain a caustic soda solution having a major portion of the iron impurity removed therefrom.

16. In a process for removing a substantial proportion of the initial iron impurities from solutions of caustic soda, the addition thereto of a compound selected from the group consisting of active magnesium hydroxide and active magnesium oxide at a temperature in the range of 40 to 85° C. agitating the mixture for at least 5 hours, and the separation of a caustic soda having a major proportion of the iron impurities removed therefrom.

17. In a process for removing a substantial proportion of the initial iron impurities from solutions of caustic soda containing from 40 to 70 weight percent of sodium hydroxide, the addition thereto of a compound selected from the group consisting of active magnesium hydroxide and active magnesium oxide in the proportions of 7 to 30 pounds per ton of anhydrous caustic soda and 1½ to 10 pounds of anhydrous caustic soda respectively at a temperature in the range of 55 to 80° C., agitating the mixture from 8 to 12 hours and separating a caustic soda solution having a major portion of the iron impurities removed therefrom.

18. In a process for removing a substantial proportion of the initial iron impurities from solutions of caustic soda containing from 40 to 70 weight percent of sodium hydroxide, the addition thereto of a compound selected from the group consisting of active magnesium hydroxide and active magnesium oxide in the proportions of 8 pounds per ton of anhydrous caustic soda solution at a temperature of 60° C., agitating the solution for 9 hours and filtering to obtain a caustic soda solution having a major proportion of the iron impurities removed therefrom.

References Cited in the file of this patent

UNITED STATES PATENTS

| | | |
|---|---|---|
| 1,997,691 | Koch | Apr. 16, 1935 |
| 2,262,246 | Muskat et al. | Nov. 11, 1941 |
| 2,479,138 | Scoles | Aug. 16, 1949 |
| 2,634,192 | Smith | Apr. 7, 1953 |